United States Patent
Gill

[11] Patent Number: 5,571,316
[45] Date of Patent: Nov. 5, 1996

[54] SILICATE-DEXTRIN ADHESIVE COMPOSITIONS

[75] Inventor: Petra Gill, Warminster, Pa.

[73] Assignee: PQ Corporation, Valley Forge, Pa.

[21] Appl. No.: 607,905

[22] Filed: Feb. 28, 1996

[51] Int. Cl.[6] .................................................. C09J 103/02
[52] U.S. Cl. ........................................ 106/617; 106/205.9
[58] Field of Search .................................... 106/208, 209, 106/617, 213, 214

[56] References Cited

U.S. PATENT DOCUMENTS

| | | | |
|---|---|---|---|
| 2,078,836 | 4/1937 | Carter | 106/617 |
| 3,433,691 | 3/1969 | Reese | 106/617 |
| 3,767,440 | 10/1973 | Olix | 106/617 |
| 4,066,463 | 1/1978 | Chollet | 106/617 |
| 4,437,893 | 3/1984 | Krinski et al. | 106/617 |
| 4,828,616 | 5/1989 | Yamasoe | 106/617 |

FOREIGN PATENT DOCUMENTS

| | | | |
|---|---|---|---|
| 1268127 | 3/1972 | United Kingdom | 106/617 |

*Primary Examiner*—Anthony Green
*Attorney, Agent, or Firm*—Ernest G. Posner

[57] ABSTRACT

An adhesive composition comprising (in percent by weight) from about 0.05 to about 0.50% of sodium silicate, from about 10 to about 47% of dextrin, from about 17 to about 70% of an alkali metal silicate, from about 0.05 to about 0.50% of sodium metaborate octahydrate or sodium metaborate tetrahydrate, and from about 18.0 to about 62.0% water and a process for preparing the same. The adhesive composition is useful in the manufacture of paper products, such as, paper tubes, corrugated boards and corner boards.

7 Claims, No Drawings

SILICATE-DEXTRIN ADHESIVE COMPOSITIONS

BACKGROUND OF THE INVENTION

1. Field of the Invention

The present invention relates to silicate-dextrin adhesive compositions and process for producing the same.

2. Reported Developments

Aqueous alkali metal silicates, particularly sodium silicates, are very old in the art and have many technical applications including their use as binders in coatings and as adhesives for solid fiber and corrugated boxes and cartons and plywood manufacture. They are versatile adhesives, combining convenience for use with strength and rigidity. However, in their use in the manufacture of paper products, such as paper tubes, they do not provide sufficient initial tack and may cause breakdown of the manufacturing process.

Dextrin and modified dextrins have also been used as adhesives for various applications, including many uses in the paper industry. While these adhesives quickly develop initial tack, they are difficult to clean from the processing machinery. They also do not have the strength and rigidity which the silicate-type adhesives have and their use is rather limited in the paper industry where strength and rigidity is required.

In order to provide the desirable characteristics of quick initial tack, rigidity and strength in adhesives intended for use in the paper industry, aqueous alkali silicates were combined with dextrin, as in U.S. Pat. No. 3,433,691. In so doing, the prior art has found that at least about one percent of dextrin is required to improve the initial tack quality over that obtained with straight silicate adhesives. While the initial tack requirement could be improved with the addition of more than one percent dextrin, thereby enabling a fast, automatic process in the manufacture of paper laminates, another problem arose. When the composition contained more than about 0.5 percent dextrin, the dextrin "floated out", rising to the surface of the adhesive composition. This floating out was observed both at the time of application of the adhesive to paper products and on storage of the adhesive. The floating out has resulted in faulty paper products and clogging of the complex dispensing apparatus.

U.S. Pat. No. 3,767,440 report that the floating out problem has been overcome by the addition to the aqueous alkali metal silicate/dextrin adhesive composition of a clay slurry consisting of a swelling type clay and a kaolin type clay. The addition of the clay slurry renders the adhesive composition thixotropic and prevents floating out of the dextrin from the adhesive composition.

The prior art also addresses the need of flame-resistant adhesive compositions, such as disclosed in U.S. Pat. No. 4,066,463, which discloses the combination of asbestos fibers with alkali metal silicate, starch, carboxymethylcellulose and dextrin.

Other references are directed to the use of vegetable proteins in silicate containing adhesives, such as: U.S. Pat. Nos. 2,457,108 and 2,681,290. These adhesives require heat on application to the surfaces to be joined and to form the necessary bond between the surfaces. Still other references disclose the use of cellulosic material, such as wood pulp to control viscosity, for example, U.S. Pat. No. 3,241,990, or soy polysaccharides, for example, U.S. Pat. No. 4,437,893 in combination with alkali metal silicates.

The object of the present invention is to provide a silicate-dextrin based adhesive composition having superior initial tack, adhesive strength and other desirable characteristics heretofore not quite satisfactorily provided for use in the paper industry including but not limited to tube winding, corrugated and corner boards.

SUMMARY OF THE INVENTION

The adhesive composition of the present invention comprises a mixture:
- (a) of from about 0.05 to about 0.50% w/w, and preferably about 0.20% w/w of sodium metasilicate;
- (b) of from about 10 to about 47% w/w, and preferably about 21% w/w of dextrin;
- (c) of from about 17 to about 70% w/w, and preferably about 58% w/w of an alkali metal silicate, preferably sodium silicate;
- (d) of from about 0.05 to about 0.50% w/w of sodium metaborate octahydrate or sodium metaborate tetrahydrate; and
- (e) of from about 18.0 to about 62.0% w/w, and preferably about 21% w/w of water.

The adhesive composition of the present invention is prepared by the following steps the order of which is critical:
1. adding of from about 0.05 to about 0.50% w/w of sodium metasilicate to of from about 18.0 to about 62.0% w/w water, while vigorously stirring, to obtain a solution of the sodium metasilicate;
2. adding with continuous stirring of from about 10 to about 47% w/w dextrin to obtain a solution of sodium metasilicate/dextrin;
3. adding with continuous stirring of from about 17 to about 70% w/w of an alkali metal silicate, preferably sodium silicate, to obtain a solution of sodium metasilicate/dextrin/alkali metal silicate; and
4. adding with continuous stirring of from about 0.05 to about 0.50% w/w of sodium metaborate octahydrate.

The adhesive composition so prepared may be stored at any temperature, including temperatures below freezing, as long as the temperature is maintained below 38° C.

The sources of components are readily available commercially and may also be prepared by methods known in the art.

Sodium metasilicate is well-known and used commercially and is described, for example by Faith, Keyes & Clark's Industrial Chemicals, F. A. Lowenheim, M. K. Moran, Eds. Wiley-Interscience, New York, 4th Edition, 1975, pp. 755–761.

Sodium silicate in dry form of $Na_2SiO_3$, $Na_6Si_2O_7$ and $Na_2Si_3O_7$ having a 2.0 to 5.5 ratio of $SiO_2$ to $Na_2O$ is preferred for use in the adhesive compositions of the present invention. However, sodium silicate solutions may also be used in which case, the water content of the solution should be considered so that the above-identified composition ranges are satisfied.

Typical commercial alkali metal silicates are shown in Table I.

TABLE I

| Alkali Metal | Wt. Ratio $SiO_2:M_2O$ | $SiO_2$ (%) | $Na_2O$ (%) | Density (lb/gal) | Viscosity (centipoise) |
|---|---|---|---|---|---|
| Sodium | 3.75 | 25.3 | 6.75 | 11.0 | 220 |
|  | 3.25 | 29.9 | 9.22 | 11.8 | 830 |
|  | 3.25 | 28.4 | 8.7 | 11.6 | 160 |
|  | 3.22 | 27.7 | 8.6 | 11.5 | 100 |

TABLE I-continued

| Alkali Metal | Wt. Ratio SiO$_2$:M$_2$O | SiO$_2$ (%) | Na$_2$O (%) | Density (lb/gal) | Viscosity (centipoise) |
|---|---|---|---|---|---|
| | 2.87 | 32.0 | 11.1 | 12.4 | 1,250 |
| | 2.58 | 32.1 | 12.5 | 12.6 | 780 |
| | 2.50 | 26.5 | 10.6 | 11.7 | 60 |
| | 2.40 | 33.2 | 13.85 | 13.0 | 2,100 |
| | 2.20 | 29.2 | 13.3 | 12.5 | — |
| | 2.00 | 29.4 | 14.7 | 12.8 | 400 |
| | 2.00 | 36.0 | 18.0 | 14.1 | 70,000 |
| | 1.90 | 28.5 | 15.0 | 12.7 | — |
| | 1.80 | 24.1 | 13.4 | 12.0 | 60 |
| | 1.60 | 31.5 | 19.7 | 14.0 | 7,000 |
| Potassium | 2.50 | 20.8 | 8.3 | 10.5 | 40 |
| | 2.20 | 19.9 | 9.05 | 10.5 | 7 |
| | 2.10 | 26.3 | 12.5 | 11.5 | 1,050 |

Sodium metaborate octahydrate is also available commercially and is made by fusing borax and sodium carbonate.

Dextrin is available in various forms such as canary yellow and white dextrin and is produced by the dry heating of unmodified starches. It is preferred to use white dextrin for certain paper end products; and the highly soluble linear dextrin sold under the tradename AMAIZO1752-S DEXTRIN sold by American Maize-Products Co., Hammond, Ind.

The following examples will demonstrate by way of illustration some of the preferred adhesive compositions of the present invention, and the process of their preparation. The sodium metasilicate in the mount of from 0.05 to about 0.50% w/w must be added and dissolved in water prior to the addition of dextrin.

EXAMPLE 1

0.5 grams of sodium metasilicate is dissolved in 35 grams of water followed by the addition of 65 grams of Dextrin with stirring. 23.08 grams of the mix is added to 76.92 grams of silicate and mixed with stirring until the mixture becomes homogeneous. 0.30 grams of sodium metaborate octahydrate is then added and mixed well with the homogeneous mixture at room temperature.

EXAMPLE 2

0.08 grams of sodium metasilicate is dissolved in 35 grams of water followed by the addition of 65 grams of Dextrin with stirring. 34.64 grams of this mix is added to a mixture of 57.69 sodium silicate, 0.30 grams of sodium metaborate tetrahydrate and 7.39 grams of water. The combined mixtures are then mixed at room temperature to homogeneity.

EXAMPLE 3

0.10 grams of sodium metasilicate is dissolved in 35 grams of water followed by the addition of 65 grams of Dextrin with stirring. 46.15 grams of this mix is added to 38.36 grams of potassium silicate, 0.35 grams of sodium metaborate octahydrate and 15.03 grams of water. The ingredients are mixed at room temperature until the mixture becomes homogeneous.

EXAMPLE 4

0.20 grams of sodium metasilicate is dissolved in 35 grams of water followed by the addition of 65 grams of Dextrin with stirring. 15.38 grams of this mix is added to 51.0 grams of sodium silicate, 0.28 grams of sodium metaborate tetrahydrate and 33.33 grams of water. The ingredients are mixed at room temperature until the mixture becomes homogeneous.

EXAMPLE 5

0.50 grams of sodium metasilicate is dissolved in 35 grams of water followed by the addition of 50 grams of Dextrin with stirring. 30 grams of this mix is added to 70 grams of sodium silicate. The ingredients are mixed at room temperature until the mixture becomes homogeneous.

EXAMPLE 6

0.30 grams of sodium metasilicate is dissolved in 35 grams of water followed by the addition of 20 grams of Dextrin with stirring. 20 grams of this mix is added to 79.70 grams of sodium silicate and 0.30 grams of sodium metaborate octahydrate. The ingredients are mixed at room temperature until the mixture becomes homogeneous.

EXAMPLE 7

0.40 grams of sodium metasilicate is dissolved in 35 grams of water followed by the addition of 20 grams of Dextrin with stirring. 50 grams of this mix is added to 49.70 grams of sodium silicate and 0.30 grams of sodium metaborate octahydrate. The ingredients are mixed at room temperature until the mixture becomes homogeneous.

EXAMPLE 8

To a large container, having a mixer capable of operating at variable speed, are added 15 gallons of water and 1.25 lbs sodium metasilicate. The components are stirred at moderate speed at room temperature until the sodium metalsilicate dissolves. 125 lbs of dextrin is then added and the mixture is stirred at slow speed for about 30 minutes followed by the addition of 305 lbs of sodium silicate with stirring for another 10 minutes. 1.3 lbs of sodium metaborate is added while stirring the mixture for an additional 10 minutes.

The adhesive formulations of the present invention are utilized in making paper products, such as paper tubes, corrugated boards and angle boards, comprising layers of paper adhered to each other by the adhesive formulation. The properties of the final product is a function of the paper used, number of layers of the paper and the particular adhesive used. It was found that an adhesive formulation of the present invention having a solid content of from about 30% w/w to about 44% w/w is required to satisfy the various requirements in the final product. Experiments performed using various solid contents in the formulations showed the following viscosities which indicate the operable utility range. Examples 9–14, the preparations of which are analogous to Examples 1–7, show % solid contents and associated viscosities in Table II.

TABLE II

| Example | Viscosity (cps) | % w/w Solids |
|---|---|---|
| 8 | 3400 | 44 |
| 9 | 766 | 41.8 |
| 10 | 368 | 38.4 |
| 11 | 721 | 40.5 |
| 12 | 332 | 37.8 |
| 13 | 220 | 35 |
| 14 | 150 | 33.2 |

Stability testing was performed on samples at 0° C., 5° C., 21° C., 38° C. and 70° C. using IR spectroscopy and visual inspection methods for determining stability. The date obtained is shown in Table IV.

TABLE IV

| Samples at Temperatures °C. | |
| --- | --- |
| 0 = | stable for more than six months |
| 5 = | stable for more than six months |
| 21 = | stable for more than six months |
| 38 = | stable for more than six months |
| 70 = | unstable after one hour as shown by IR; visually it is dark brown. |

Having described the invention with reference to its preferred embodiments, it is to be understood that modifications within the scope of the invention will be apparent to those skilled in the art.

What is claimed is:

1. An adhesive composition comprising:
   (a) from about 0.05 to about 0.50% w/w of sodium metasilicate;
   (b) from about 10 to about 47% w/w of dextrin;
   (c) from about 17 to about 70% w/w of an alkali metal silicate;
   (d) from about 0.05 to about 0.50% w/w of sodium metaborate octahydrate or sodium metaborate tetrahydrate; and
   (e) from about 18.0 to about 62.0% w/w water.

2. The composition of claim 1 comprising:
   0.5% w/w sodium metasilicate;
   21% w/w dextrin;
   58% w/w alkali metal silicate;
   0.5% w/w sodium metaborate octahydrate; and
   21% w/w water.

3. The composition of claim 1 wherein said alkali metal silicate is sodium silicate.

4. The composition of claim 1 wherein said alkali metal silicate is potassium silicate.

5. The process of making an adhesive composition comprising:
   (a) adding from about 0.05 to about 0.50% w/w of sodium metasilicate to from about 18.0 to about 62.0% w/w water, while vigorously stirring, to obtain a solution of the sodium metasilicate;
   (b) adding with continuous stirring from about 10 to about 47% w/w dextrin to obtain a solution of sodium metasilicate/dextrin;
   (c) adding with continuous stirring from about 17 to about 70% w/w of an alkali metal silicate to obtain a solution of sodium metasilicate/dextrin/alkali metal silicate; and
   (d) adding with continuous stirring from about 0.05 to about 0.5% w/w of sodium metaborate octahydrate or sodium metaborate tetrahydrate.

6. The process of claim 5 wherein said alkali metal silicate is sodium silicate.

7. The process of claim 5 wherein said alkali metal silicate is potassium silicate.

* * * * *